(12) United States Patent
Fukunaga et al.

(10) Patent No.: US 6,583,637 B2
(45) Date of Patent: Jun. 24, 2003

(54) LOAD-CONTROL-TYPE ACTUATOR

(75) Inventors: Shigeki Fukunaga, Yokaichi (JP); Shigeru Tsuji, Omihachiman (JP); Kenichiro Maki, Omihachiman (JP)

(73) Assignee: Murata Manufacturing Co., Ltd., Nagaokakyo (JP)

(*) Notice: Subject to any disclaimer, the term of this patent is extended or adjusted under 35 U.S.C. 154(b) by 47 days.

(21) Appl. No.: 09/881,729

(22) Filed: Jun. 18, 2001

(65) Prior Publication Data

US 2002/0063481 A1 May 30, 2002

(30) Foreign Application Priority Data

Jun. 16, 2000 (JP) ......................................... 2000-181171

(51) Int. Cl.[7] .............................................. G01R 31/02
(52) U.S. Cl. ........................................ 324/755; 324/760
(58) Field of Search .............................. 324/158.1, 754, 324/755, 756, 758, 759, 760

(56) References Cited

U.S. PATENT DOCUMENTS 4,839,587 A * 6/1989 Flatley et al. ............... 324/760
6,078,185 A * 6/2000 Tanaka et al. ............... 324/755

OTHER PUBLICATIONS

Cyril M. Harris, Harris' Shock and Vibration Handbook, 2002 5th ed.,2.1–2.10.*

* cited by examiner

Primary Examiner—N. Le
Assistant Examiner—Donald M Lair
(74) Attorney, Agent, or Firm—Burns, Doane, Swecker & Mathis, LLP (57) ABSTRACT

A load-control type actuator is provided, in which the impact load applied to a workpiece is reduced enabling damages in the workpiece to be small. A load-control-type actuator includes a nozzle which comes into contact with a workpiece, a nozzle holder for supporting the nozzle via a spring, and a voice-coil motor which can control a thrust driving force to the nozzle holder. The spring constant of the spring is set so that the spring reaction force of the spring within the response time of the voice-coil motor is reduced smaller than the maximum impact load when the nozzle touches the workpiece. The nozzle is suspended and supported by the spring and the initial load thereof is set to zero.

12 Claims, 5 Drawing Sheets

LOAD-CONTROL-TYPE ACTUATOR

BACKGROUND OF THE INVENTION

1. Field of the Invention

The present invention relates to a load-control-type actuator for use in handling equipment for mounting and assembling components and measuring and sorting equipment for measuring electrical characteristics of electronic components.

2. Description of the Related Art

Hitherto, when mounting small-size electronic components on a circuit board, component assembling apparatuses using voice-coil motors have been widely used. The voice-coil motor is excellent in positioning accuracies more than those of mounters using pneumatic power and solenoids and is also excellent in reducing a force applied to components.

Figure 1:
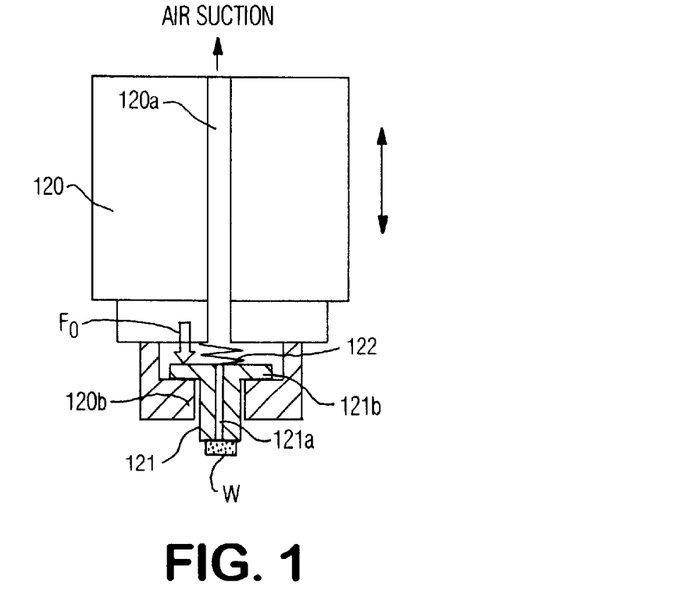
FIG. 1 is a sectional view of an example of a conventional handling apparatus using a voice-coil motor.

FIG. 1 shows an example of a conventional handling apparatus using such a voice-coil motor. A movable part 120 of a Z-axis-drive mechanism is driven by a voice-coil motor in the vertical direction. A nozzle 121 is arranged at lower end of the movable part 120 and a built-in spring 122 is arranged interposing between the movable part 120 and the nozzle 121. In the nozzle 121, a sucking port 121a is formed, which is communicated with a vacuum sucking device (not shown) via a sucking port 120a of the movable part 120a. A workpiece W is thereby held at tip end of the nozzle 121. On the external periphery of the nozzle 121, a flange 121b is unitarily formed, which is downwardly urged by a spring 122 in touch onto a receiving portion 120b formed at the lower end of the movable part 120 and the flange 121b is held thereto.

An initial load is applied to the spring 122 in order to hold the nozzle 121 when the movable part 120 moves vertically as described above. Accordingly, an impact load produced when the nozzle 121 touches the workpiece W or when the nozzle 121 having the workpiece W held thereon touches an object (circuit board, etc.) is certainly lager than the initial load, product defects such as cracks and chips are caused during handling or mounting small-size and thin elements.

Such problems are not limited to handling equipment; in measuring and sorting equipment, for example, the problem also rises when a measuring probe is urged onto an electronic component so as to measure electrical characteristics of the electronic component.

In component-assembling equipment having the sucking nozzle 121, when air leakage is generated due to non-existence of a sucked component or disagreement in sucking, a sucking force by air and the initial load of the spring 122 are out of balance so that the initial load becomes larger causing damages of workpieces during the handling. Furthermore, since the sucking port 121a is released when a workpiece W is to be picked up by sucking, the initial load does not become large so much; however, when placing the workpiece W on a circuit board, etc., after picking it up, because the sucking port 121a of the nozzle 121 is closed, the nozzle 121 is pulled toward the movable part 120 so that the initial load becomes larger. Therefore, there is a problem that the load applied to the workpiece W during the placing is larger than during the picking.

SUMMARY OF THE INVENTION

Accordingly, it is an object of the present invention to provide a load-control-type actuator in which an impact load applied to a workpiece can be reduced so as to prevent damages in the workpiece.

In order to achieve the above-mentioned object, a load-control-type actuator is provided, which comprises a contact part which comes into contact with a workpiece, a movable part for supporting the contact part via an elastic member, and operating means which can control a thrust driving force to the movable part, wherein provided that $F_{1max}$ denotes the maximum impact load at a time of contact between the workpiece and the contact part and $F_2$ denotes a spring reaction force of the elastic member within a response time $t_k$ of the actuator, a spring constant $k_b$ of the elastic member is set to satisfy the condition: $F_{1max} \leq F_2$.

A component assembling apparatus having a sucking nozzle for picking up and placing components will be described as an example. In the sucking nozzle having a spring built therein, the impact force to a workpiece is broken down into three forces shown in FIG. 2.

Figure 2:
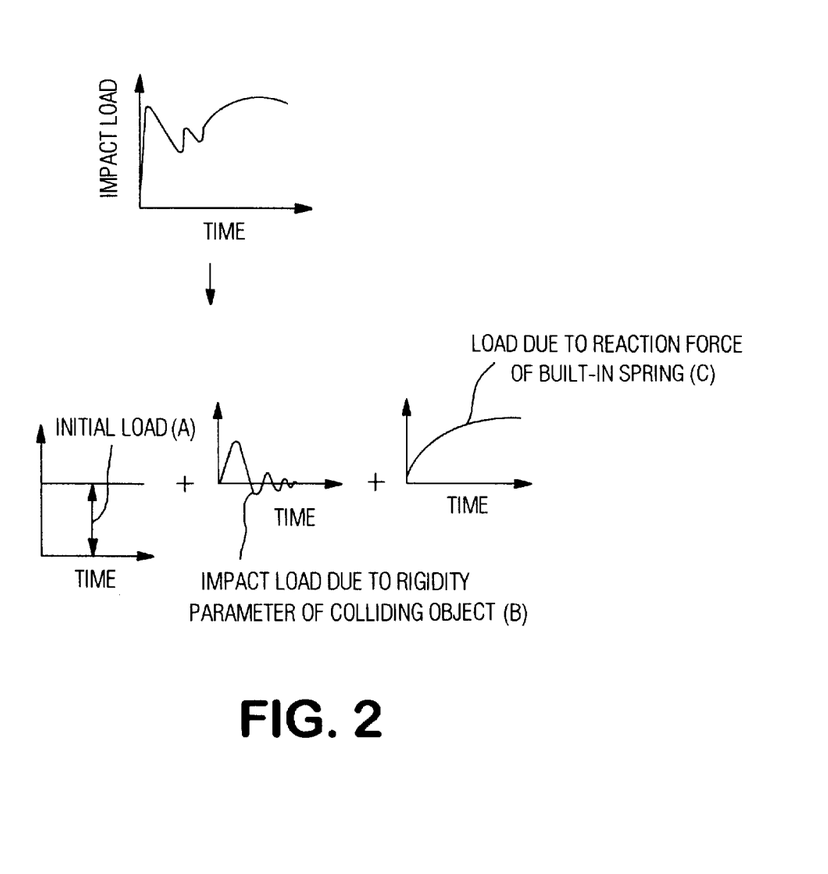
FIG. 2 is a conceptual view of an impact load between a workpiece and a nozzle.

A first force is an initial load (A); a second force is an impact load (B) due to rigidity parameter of a colliding object; and a third force is a load (C) due to a reaction spring force of a built-in spring.

From FIG. 2, it is understood that when the initial load (A) included in a conventional apparatus is eliminated, the entire impact load can be reduced.

However, since the initial load (A) is for holding the nozzle to be stable, a spring having high (hard) rigidity has to be built-in in order to have the zero initial load. When the rigidity is too high, however, since the load (C) due to a reaction spring force of a built-in spring shown in FIG. 2 influences thereon significantly, the spring constant thereof needs to be suitably designed.

Therefore, according to the present invention, the spring constant $k_b$ of the elastic member is set so that the spring reaction force $F_2$ of the elastic member within the response time $t_k$ of the actuator is reduced smaller than the maximum impact load $F_{1max}$ between the workpiece and the contact part.

Thereby, the impact load applied to the workpiece is reduced enabling damages in the workpiece to be reduced small. Moreover, since the contact part can be held to be stable while reducing the initial load to be small, the movable part can be operated in a high speed.

The spring constant $k_b$ of the elastic member can be obtained from the equation:

$$F_2 = k_b e^{-et} V_0/q \sin(qt),$$

provided that $0 \leq t \leq t_k$, and the equations:

$$e = c_b/2m_v, \quad q = [\omega^2 - \epsilon^2]^{1/2}, \text{ and } \omega^2 = k_b/m_v,$$

wherein $m_v$ is the mass of the movable part and $c_b$ is the spring viscosity.

The maximum value of the spring constant $k_b$ of the elastic member can be thereby calculated.

When the operating means is formed by a voice-coil motor, it is preferable that the response time $t_k$ range from 0.001 to 0.1 second.

A voice-coil motor is a type of a linear actuator and produces a thrust driving force in proportion to a current. When a current I is passed through a voice coil from a controller via a current amplifier, a force of F=B I L is produced in the coil by a magnetic flux density B of a magnetic circuit and a length L of a coil conductor. By the force F, the nozzle (movable part) connected to the coil via a connecting mechanism is moved. When a nozzle mechanism including the coil is lowered for handling the workpiece, for example, the nozzle can be precisely positioned (below 0.1 mm) based on a signal of a positional sensor. As described above, the impact load to the workpiece is suppressed by controlling a collision velocity and by controlling a current after collision, a precise static load is applied when approaching the workpiece.

In addition, when using the voice-coil motor, the practical range of the response time $t_k$ is approximately from 0.001 to 0.1 second.

Preferably, the operating means sequentially performs positional control so that the movable part is advanced to a position immediately before the contact part touches a workpiece, velocity control so that the movable part is advanced at a constant velocity from the position immediately before the contact to the contact position at which the contact part touches the workpiece, load control so that the movable part is further advanced while controlling the contact pressure between the contact part and the workpiece after the contact part touches the workpiece, and positional control so that the movable part is retracted so as to separate the contact part from the workpiece.

By controlling the operating means sequentially in such a manner, a load applied to the workpiece is reduced, enabling the high-speed operation to be performed with a high degree of accuracy.

The spring constant $k_b$ of the elastic member may preferably satisfy the minimum conditional equation:

$$k_b > M_n(\alpha+g)/x_{max},$$

wherein $m_n$ is the mass of the contact part, $\alpha$ is the change in velocity of the contact part at a point switching from the positional control to the velocity control, g is the gravitational acceleration, and $X_{max}$ is the maximum amplitude of the movement of the contact part at point of switching from the positional control to the velocity control.

That is, immediately before the contact part touches the workpiece, the control is switched from positional to velocity and after the switching, the contact part is slowly brought into contact with the workpiece, so that an impact load applied to the workpiece can be reduced. When the spring constant of the elastic member is too small (spring is too soft), however, the contact part vibrates vertically at point of contact so as to be unstable. Therefore, by satisfying the above-mentioned minimum conditional equation, the vibration of the contact part is suppressed so that the stable contact can be maintained when the contact part is brought into contact with the workpiece.

Preferably, the contact part is suspended from the movable part via the elastic member and the initial load of the contact part to the workpiece is zero.

That is, a comparatively hard spring is adopted as the elastic member which is assembled thereinto with an initial load of zero, so that the movement of the contact part can be stabilized while reducing the impact load.

DESCRIPTION OF THE PREFERRED EMBODIMENTS

Figure 3:
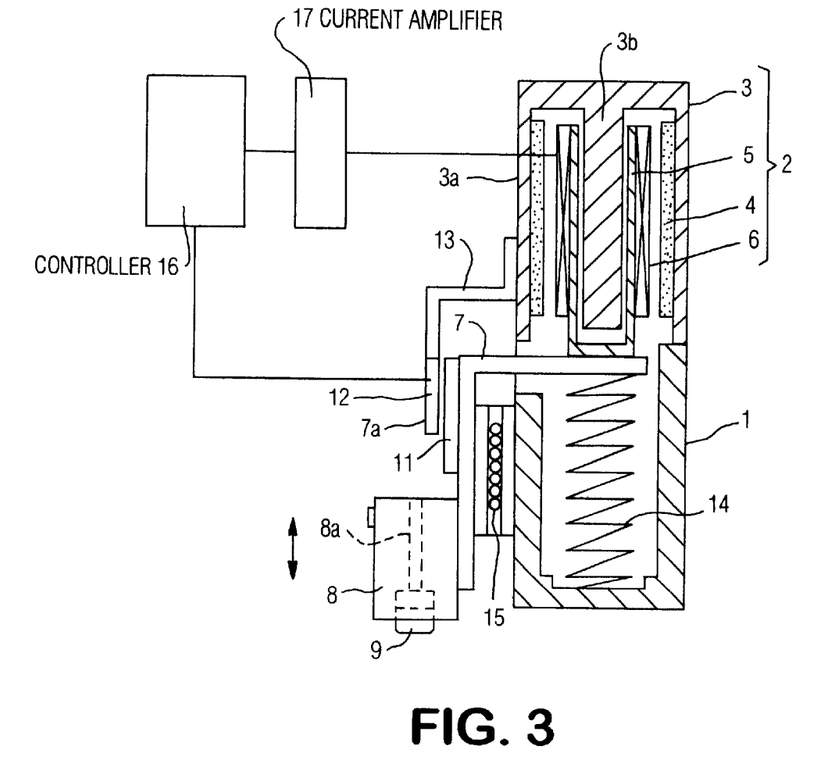
FIG. 3 is a sectional view of a load-control type actuator according to the present invention, which is applied to a handling apparatus as an example.
Figure 4:
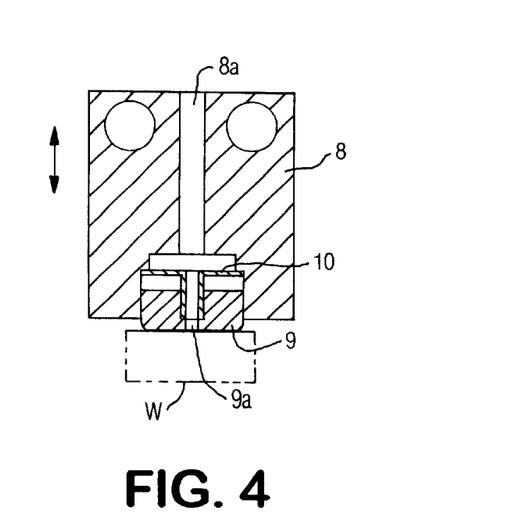
FIG. 4 is an expanded sectional view of a nozzle part of the handling apparatus shown in FIG. 3.

FIGS. 3 and 4 show an embodiment of a handling apparatus according to the present invention.

The handling apparatus comprises a chassis 1 made from a non-magnetic material and attached to a head of an X–Y robot, and on the chassis 1, a magnetic circuit 2 of a voice-coil motor is disposed. The magnetic circuit 2 comprises a yoke 3 fixed to an upper portion of the chassis 1, a magnet 4 fixed on an internal face of a cylindrical section 3a of the yoke 3, a bobbin 5 vertically movably inserted by a central magnetic pole 3b of the yoke 3, and a coil 6 wound about the bobbin 5. The coil 6 is overlapped with the magnet 4 in an axial direction. In this embodiment, the magnet 4 is disposed in the fixed side while the coil 6 is disposed in the movable side; however, in contrast, the coil 6 may be disposed in the fixed side while the magnet 4 may be disposed in the movable side.

On the lower end face of the bobbin 5, one end of a connecting member 7 is fixed and the other end thereof protrudes in the radial direction from the chassis 1 and the yoke 3, and to a protruding section 7a thereof, a nozzle holder (movable part) 8 is fixed. At the lower end of the nozzle holder 8, as shown in FIG. 4, a nozzle (touching portion) 9 having a sucking hole 9a formed thereon for sucking a workpiece W is vertically movably fitted and is suspended and supported via a built-in spring 10 relative to the nozzle holder 8. In this embodiment, a leaf spring is used as the spring 10; a coil spring or a coned disk spring may be used. The sucking hole 9a of the nozzle 9 is communicated with an air port 8a of the nozzle holder 8, and the air port 8a is communicated with an air sucking device (not shown) via an air horse, etc.

To the protruding section 7a of the connecting member 7, a detecting element 11 is fixed and in a position opposing the detecting element 11, a position-detecting sensor 12 is arranged, which is connected to the chassis 1 or the yoke 3 via a retainer 13.

Inside the chassis 1, a spring 14 for upwardly urging the connecting member 7 is arranged, so that the nozzle 9 can be urged to return to a home position (upper limit position). Between the connecting member 7 and the chassis 1, a linear guide 15 is arranged so that the connecting member 7 can smoothly move in the vertical direction (Z-axis direction).

A signal detected by the position-detecting sensor 12 is inputted in a controller 16 which in turn outputs a command signal to a current amplifier 17 based on the detected positional signal so as to feed a current through the coil 6. Thereby, a thrust force is applied to the coil 6 in proportion to a magnetic flux density, a current, and a conductor length of the coil, so that the nozzle holder 8 connected to the coil 6 via the connecting member 7 also is vertically moved. In such a manner, the height of not only the nozzle holder 8 but also of the nozzle 9 can be controlled with a high degree of accuracy (less than±0.1 mm, for example).

Next, design principles of the spring 10 suspending and supporting the nozzle 9 will be described.

First, an impact force produced when two objects such as the nozzle and a workpiece collide with each other is approximated with the following equation of the single-degree-of-freedom oscillation.

$$m_0\ddot{x} + c_0\dot{x} + k_0 x = 0$$

wherein, $m_0$: total mass of two objects after collision
$k_0$: rigidity
$C_0$: viscosity
$\dot{x}$: velocity imediately after collision In addition, for each of the rigidity $k_0$ and the viscosity $c_0$, the smallest value in the nozzle, the workpiece, and the workpiece-mounting surface is used as the representative value. When the above-equation is solved for x:

$$x = e^{-\varepsilon t}\frac{V_0}{q}\sin(qt)$$

as this time, $\varepsilon = \frac{c_0}{2m_0}$, $q = \sqrt{\omega^2 - \varepsilon^2}$, $\omega^2 = \frac{k_0}{m_0}$ In addition, numeral $V_0$ denotes an initial value of the strain rate of the object just after collision.

Since the impact force is given by $F_1 = k_0 x$, the maximum value of the impact load is at the time of $q\ t = \pi/2$, the maximum value $F_{1max}$ of the impact load is obtained by:

$$F_{1max} = k_0 \cdot e^{-\frac{\varepsilon\pi}{2q}} \cdot \frac{V_0}{q} \quad (3)$$

As shown in equation 3), the velocity $V_0$ just after collision is important for controlling the impact load F1.

Wherein $V_0$ is obtained by:

$$V_0 = \frac{m_2}{m_1 + m_2} V_1$$

Provided that $V_1$ is the collision velocity of an object having mass $M_2$, and the velocity before collision of an object having mass $m_1$ is zero.

The above equation is based on the law of conservation of momentum and shows that the velocity $V_0$ just after collision is affected by the collision velocity and the mass of two objects.

Figure 5:
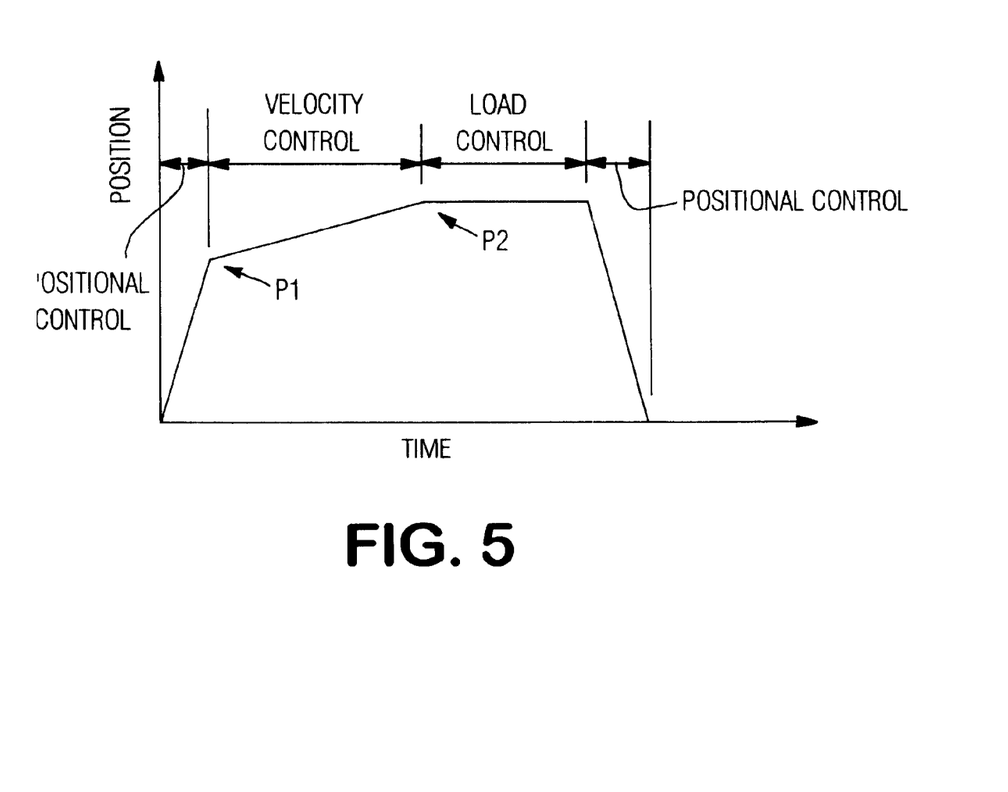
FIG. 5 is a diagram showing a method for switching control of position-velocity-load.

By using a voice-coil motor shown in FIG. 3 as a Z-axis mechanism when touching a workpiece, the collision velocity is controlled by the position-velocity-load switching control as shown in FIG. 5. In FIG. 5, the following controls are sequentially performed: first, a positional control that the nozzle holder 8 is lowered to a position immediately before the nozzle 9 touches a workpiece W (switching point); a velocity control that the nozzle holder 8 is lowered at a constant velocity from the switching point to the contact position at which the nozzle 9 touches the workpiece W; a load control that the nozzle holder 8 is further lowered while controlling contact pressure between the nozzle 9 and the workpiece W after the nozzle 9 touched the workpiece W; and a positional control that the nozzle holder 8 is raised so as to separate the nozzle 9 from the workpiece W.

Figure 6:
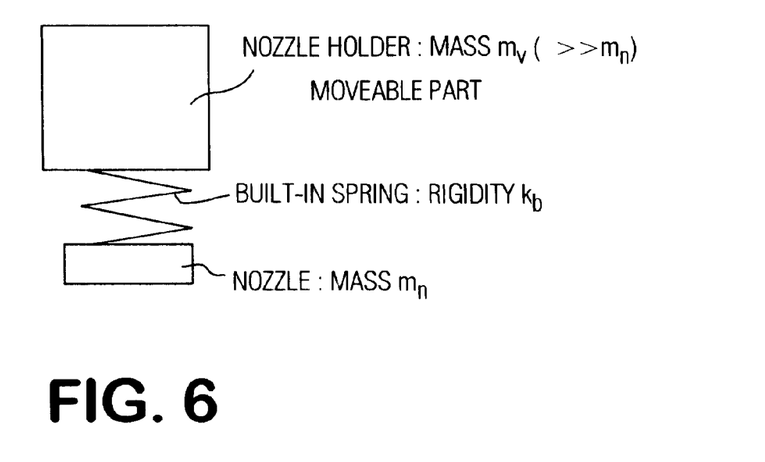
FIG. 6 is a conceptual view of a nozzle.

In the switching control shown in FIG. 5, suitable design principles of a spring constant will be shown as follows:

(I) Design conditions at the switching point (position-velocity switching point P1 in FIG. 5):

FIG. 6 is a conceptual drawing of a nozzle structure; under the nozzle holder, the nozzle is suspended via the built-in spring, wherein numeral $m_v$ denotes the mass of the nozzle holder (provided that $m_v > m_n$); numeral $k_b$ denotes the spring constant of the built-in spring; numeral $m_n$ denotes the mass of the nozzle.

At the switching point, the control is transferred from the positional control to the velocity control at a constant velocity. Therefore, when numeral $\alpha$ denotes the velocity change (negative value) generated at the switching:

$$m_n\alpha + m_n g - k_b x = 0$$

$$x = \frac{m_n(\alpha + g)}{k_b}$$

Therefore, in order to design the movement of the tip end of the nozzle to be of small degree, the spring constant $k_b$ is suitably determined by using the above-equation.

For example, when the movement at the position-velocity switching point (P1 point) is reduced below an arbitrary amplitude $x_{max}$, the spring constant is designed to be large according to the following condition.

$$x_{max} > \frac{m_n(\alpha + g)}{k_b} \quad \ldots \text{design condition} \quad (1)$$

The above equation (1) is a conditional equation for the minimum spring constant. The amplitude $x_{max}$ is given by the sum of the resolving power of a position sensor, the mechanism clearance, the height clearance of the switching point, and so forth.

In addition, in FIG. 6, it is supposed to minimize the mass $m_n$ of the nozzle 9 by offering the nozzle 9 itself springing rigidity. In this case, the small spring constant $k_b$ can be achieved so as to have a benefit of reducing the impact force.

Figure 7:
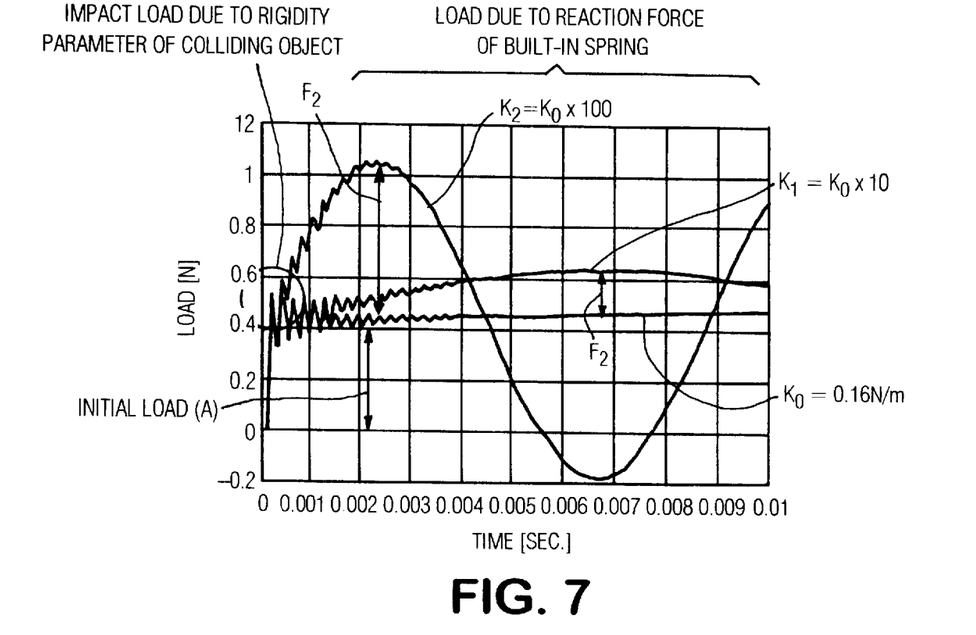
FIG. 7 is a graph showing the simulated results of the relationship between the spring rigidity and the impact load.

(II) Design conditions at the contact point (velocity-load switching point P2 in FIG. 5):

FIG. 7 shows an example of an impact-force waveform (simulation) at collision when the springing rigidity ($k_b = k_0$) of the built-in spring 10 is changed.

Specifically, FIG. 7 shows the simulated results of impact loads in a two-degrees-freedom model having a conventional spring ($k_0 = 0.16$ N/mm), a spring having a spring constant ten times ($k_1 = k_0 \times 10$) larger than that of the conventional spring, and a spring having a spring constant 100 times ($k_2 = k_0 \times 100$) larger than that thereof.

It is understood from FIG. 7 that impact peaks (B) immediately after collision obtained as impact loads are scarcely affected by the springs built-in the nozzle. This is because the frequency of attenuating vibration determined by the spring constant is different by one order or more from the frequency of impact waves determined by rigidities of the nozzle and a workpiece. That is, since the movement of the nozzle can be stabilized without changing the impact load even when using a comparatively hard spring, the condition that the initial load is zero can be included.

When the spring constant k is increased, the load (C) due to the reaction force of the built-in spring is increased larger than the impact load (B) due to rigidity parameter of the colliding object.

The impact force F1 in the above-mentioned equation (3) is equivalent to the impact load (B) due to rigidity parameter.

Similarly, the force $F_2$ which is the load (C) due to the reaction force of the built-in spring is represented by the following equation:

$$m_v\ddot{x} + C_b\dot{x} + k_b x = 0$$

wherein, $m_v$: nozzle holder mass (VCM movable part mass)

$k_b$: spring rigidity, $c_b$: spring viscosity $\dot{x}$: velocity imediately after collision $V_0$ (initial strain rate of spring)

When this equation is solved for x;

$$x = e^{-st}\frac{V_0}{q}\sin(qt)$$

as this time, $\varepsilon = \frac{c_b}{2m_v}$, $q = \sqrt{\omega^2 - \varepsilon^2}$, $\omega^2 = \frac{k_b}{m_v}$ From $F_2 = k_b x$, the load due to a spring reaction force is:

$$F_2 = k_b \cdot e^{-st}\frac{V_0}{q}\sin(qt) \quad (4)$$

In addition, the maximum value of the impact force $F_2$ is:

$$F_{2max} = k_b \cdot e^{-\frac{\varepsilon\pi}{2q}} \cdot \frac{V_0}{q}$$

Based on the precondition that the velocity-load switching control is performed as described above, during the period of time $t_k$ for completion of switching as the response of the control system, it is necessary that the load $F_2$ shown in equation (4) due to the spring reaction force be reduced so as not to exceed the maximum value $F_{1max}$ of the impact load shown in equation (3) due to rigidity parameter of the colliding object.

Therefore, the following conditional equation is given as the condition for the maximum spring rigidity.

$F_{1max} \geq F_2$ design condition (2)

(range: $0 \leq t \leq t_k$)

Numeral $t_k$ denotes the response period of time, and when using a voice-coil motor (VCM), the practical range of $t_k$ is approximately from 0.001 to 0.1 second.

As described above, by determining the spring constant $k_b$ using the design conditions (1) and (2), the impact force generated when the nozzle 9 collides a workpiece W can be restrained to be minimal, and moreover, fluctuations of the nozzle 9 at the time of switching can be suppressed to be minimal.

Figure 8:
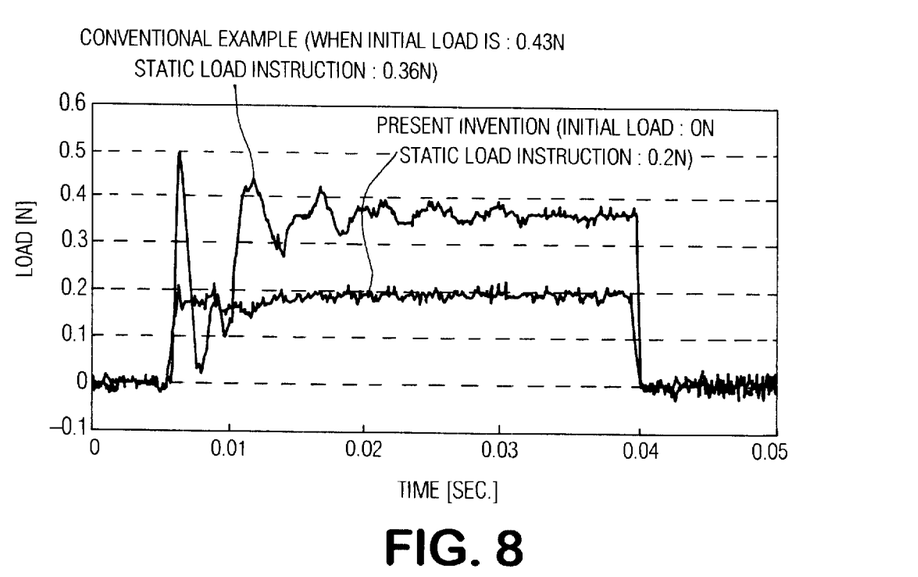
FIG. 8 is a graph showing the impact loads compared between a conventional example and an example according to the present invention.

FIG. 8 shows a comparison between the impact load to a workpiece of a conventional actuator (the spring constant $k_0$=0.16 N/mm) when the initial load is 0.43 N and the static load instruction is 0.36 N and the impact load to a workpiece of an actuator according to the present invention (the spring constant $k_1 = k_0 \times 10$) when the initial load is 0 N and the static load instruction is 0.2 N. As is understood from FIG. 8, since the spring constant k1 is larger compared to a conventional constant ($k_0$) and the initial load is 0 N according to the present invention, the impact load can be reduced by half compared to a conventional example.

According to the present invention, as the spring 10, a comparatively hard spring is used so that it operates only below the sensor resolving power by the thrust force of the nozzle holder 8 produced during the positional control of the nozzle 9. Consequently, the stroke of the nozzle 9 can be also reduced, so that the nozzle 9 can be miniaturized so as to be advantageous in reduction of the impact load.

Figure 9:
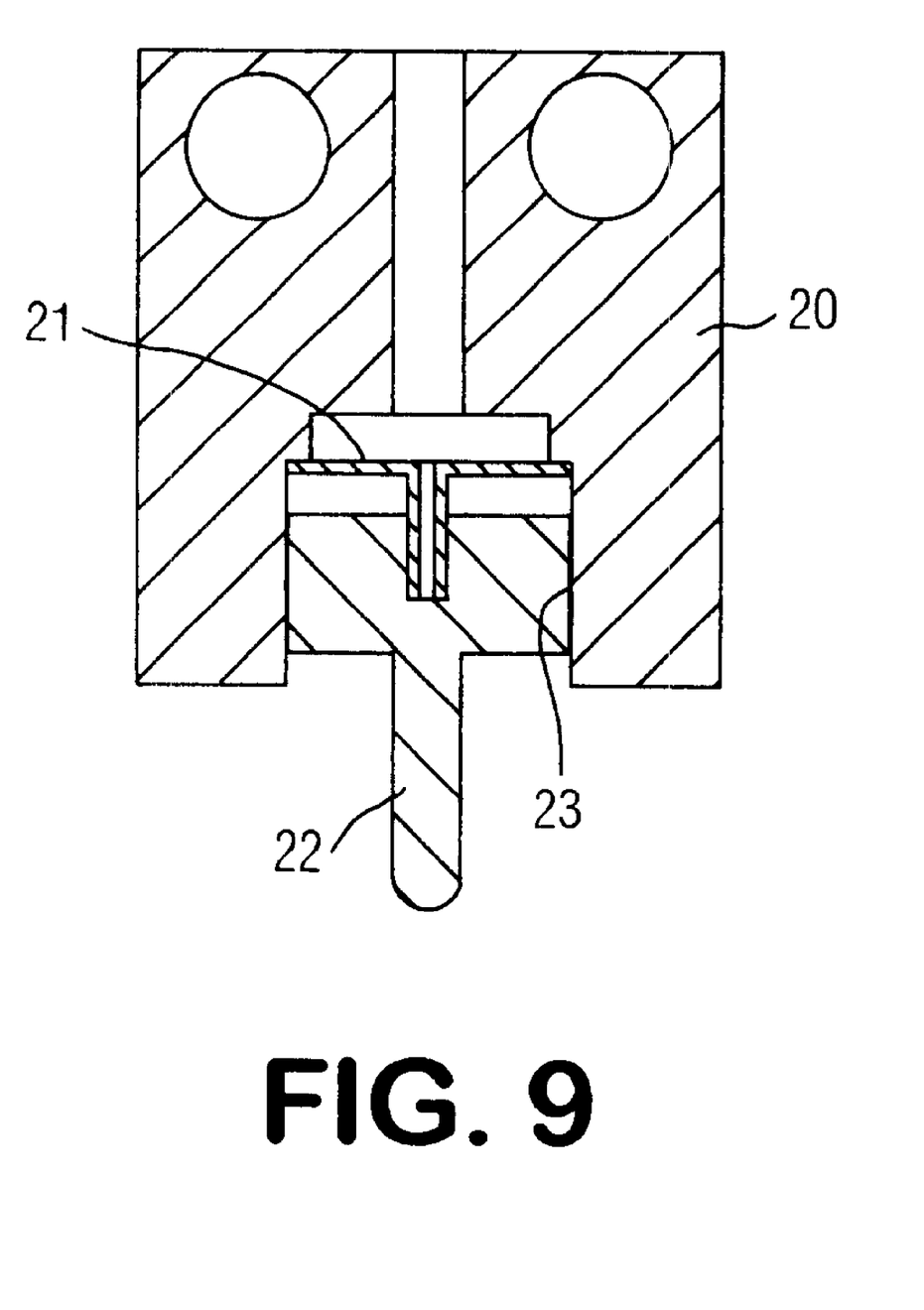
FIG. 9 is a sectional view of a load-control type actuator according to the present invention, which is applied to a measuring and sorting apparatus as an example.

An actuator for load controlling according to the present invention is applicable not only to a handling apparatus having the sucking nozzle 9 just like in the above-described embodiment but also to measuring and sorting equipment as shown in FIG. 9.

In FIG. 9, a terminal holder 20 which is a movable part of the measuring instrument is vertically driven by a voice-coil motor identical with one shown in FIG. 3. Inside the terminal holder 20, a guide hole 21 is formed, into which a measuring terminal 22 is vertically movably inserted. The measuring terminal 22 is suspended and supported via a built-in spring 23 whose periphery is fixed to the inside of the guide hole 21. Therefore, in a free state, the initial load applied to the measuring terminal 22 is set to be zero. In the embodiment, a leaf spring is used as the built-in spring 23; a coil spring may be used.

The measuring terminal 22 is electrically connected to a measuring instrument (not shown); the built-in spring 23 forms a part of a conductor for electrically connecting between the measuring terminal 22 and the measuring instrument. In addition, apart from the built-in spring 23, a conductor for electrically connecting between the measuring terminal 22 and the measuring instrument may be arranged.

Also, in the measuring and sorting equipment formed as described above, by determining the spring constant kb of the built-in spring 23 according to the maximum conditional equation (2) and the minimum conditional equation (1), the impact load produced when the measuring terminal 22 touches a workpiece can be suppressed to be minimal, and moreover, fluctuations of the measuring terminal 22 at the time of switching can be suppressed to be minimal.

What is claimed is:

1. An actuator comprising:

a contact part which comes into contact with a workpiece;

a movable part for supporting the contact part via an elastic member; and operating means which can control a thrust driving force to the movable part, wherein provided that $F_{1max}$ denotes the maximum impact load at a time of contact between the workpiece and the contact part and $F_2$ denotes a spring reaction force of the elastic member within a response time $t_k$ of the actuator, a spring constant $k_b$ of the elastic member is set to satisfy the condition:

$F_{1max} \geq F_2$, wherein the operating means sequentially performs positional control so that the movable part is advanced to a position immediately before the contact part touches a workpiece, velocity control so that the movable part is advanced at a constant velocity from the position immediately before the contact to the contact position at which the contact part touches the workpiece, load control so that the movable part is further advanced while controlling the contact pressure between the contact part and the workpiece after the contact part touches the workpiece, and positional control so that the movable part is retracted so as to separate the contact part from the workpiece.

2. An actuator according to claim 1, wherein the spring constant $k_b$ of the elastic member satisfies the equation:

$$F_2 = k_b \cdot e^{-st}\frac{V_0}{q}\sin(qt)$$

provided that $0 \leq t \leq t_k$, and the equations:

$$\varepsilon = \frac{c_b}{2m_v}, q = (\omega^2 - \varepsilon^2)^{1/2}, \omega^2 = \frac{k_b}{m_v}$$

wherein $m_v$ is the mass of the movable part and $c_v$ is the spring viscosity.

3. An actuator according to claim 1, wherein the operating means comprises a voice-coil motor and the response time $t_k$ ranges from 0.001 to 0.1 seconds.

4. An actuator according to claim 1, wherein the contact part is suspended from the movable part via the elastic member and the initial load of the contact part to the workpiece is zero.

5. An actuator according to claim 1, wherein the contact part is a nozzle which communicates with an air sucking device via a vacuum sucking port so as to suck a workpiece by a vacuum.

6. An actuator according to claim 1, wherein the contact part is a measuring terminal which is electrically connected to a measuring instrument for measuring electrical characteristics of the workpiece by touching the workpiece.

7. An actuator comprising:

a contact part which comes into contact with a workpiece;

a movable part for supporting the contact part via an elastic member; and operating means which can control a thrust driving force to the movable part, wherein provided that $F_{1max}$ denotes the maximum impact load at a time of contact between the workpiece and the contact part and $F_2$ denotes a spring reaction force of the elastic member within a response time $t_k$ of the actuator, a spring constant $k_b$ of the elastic member is set to satisfy the condition:

$F_{1max} \geq F_2$, wherein the spring constant kb of the elastic object satisfies condition:

$$k_b > \frac{m_n(\alpha + g)}{x_{max}},$$

wherein $m_n$ is the mass of the contact part, $\alpha$ is the change in velocity of the contact part at a point switching from the positional control to the velocity control, g is the gravitational acceleration, and $x_{max}$ is the maximum amplitude of the movement of the contact part at point of switching from the positional control to the velocity control.

8. An actuator according to claim 7, wherein the spring constant kb of the elastic member satisfies the equation:

$$F_2 = k_b \cdot e^{-st} \frac{V_0}{q} \sin(qt)$$

provided that $0 \leq t \leq t_k$, and the equations:

$$\varepsilon = \frac{c_b}{2m_v}, q = (\omega^2 - \varepsilon^2)^{1/2}, \omega^2 = \frac{k_b}{m_v}$$

wherein $m_v$ is the mass of the movable part and $c_v$ is the spring viscosity.

9. An actuator according to claim 7, wherein the operating means comprises a voice-coil motor and the response time $t_k$ ranges from 0.001 to 0.1 seconds.

10. An actuator according to claim 7, wherein the contact part is suspended from the movable part via the elastic member and the initial load of the contact part to the workpiece is zero.

11. An actuator according to claim 7, wherein the contact part is a nozzle which communicates with an air sucking device via a vacuum sucking port so as to suck a workpiece by a vacuum.

12. An actuator according to claim 7, wherein the contact part is a measuring terminal which is electrically connected to a measuring instrument for measuring electrical characteristics of the workpiece by touching the workpiece.

* * * * *